(12) United States Patent
Hirata et al.

(10) Patent No.: US 7,780,212 B2
(45) Date of Patent: Aug. 24, 2010

(54) VEHICLE DASHBOARD ACCOMMODATION STRUCTURE

(75) Inventors: Hideki Hirata, Zama (JP); Kazuhiko Noguchi, Sano (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 35 days.

(21) Appl. No.: 12/099,487

(22) Filed: Apr. 8, 2008

(65) Prior Publication Data

US 2008/0296923 A1     Dec. 4, 2008

(30) Foreign Application Priority Data

May 29, 2007 (JP) ............................ 2007-142487
Jan. 22, 2008 (JP) ............................ 2008-011740

(51) Int. Cl.
*B60R 7/06* (2006.01)

(52) U.S. Cl. ...................... 296/37.12; 296/70; 224/483; 224/926

(58) Field of Classification Search ................... 296/70, 296/37.12, 24.35, 208; 62/244; 224/926, 224/483; 165/41, 80.1; 180/90
See application file for complete search history.

(56) References Cited

U.S. PATENT DOCUMENTS

| | | | | |
|---|---|---|---|---|
| 4,892,138 A | * | 1/1990 | Bibik, Jr. ..................... | 165/80.1 |
| 5,165,646 A | * | 11/1992 | Gewecke .................. | 248/311.2 |
| 5,203,833 A | * | 4/1993 | Howell ......................... | 165/41 |
| 5,701,754 A | * | 12/1997 | Choi et al. .................... | 62/244 |
| 6,070,927 A | * | 6/2000 | Mieglitz et al. .......... | 296/37.12 |
| 6,155,063 A | * | 12/2000 | Felde ......................... | 62/244 |
| 6,533,232 B1 | * | 3/2003 | Aggeler .................... | 248/311.2 |
| 6,991,027 B2 | * | 1/2006 | Ozeki et al. ................. | 165/203 |
| 7,025,316 B2 | * | 4/2006 | Schaal ...................... | 248/311.2 |
| 7,073,338 B2 | * | 7/2006 | Harwood et al. ............. | 62/3.61 |
| 7,226,029 B2 | * | 6/2007 | Hoshi ...................... | 248/311.2 |
| 7,389,650 B2 | * | 6/2008 | Kukucka et al. .............. | 62/244 |
| 7,413,244 B2 | * | 8/2008 | Tanaka et al. ................ | 296/198 |

FOREIGN PATENT DOCUMENTS

JP      2000135935      5/2000

OTHER PUBLICATIONS esp@cenet patent abstract of Japanese publication No. 2000-135935, published May 16, 2000 (2 pages).

* cited by examiner

*Primary Examiner*—Glenn Dayoan
*Assistant Examiner*—Gregory Blankenship
(74) *Attorney, Agent, or Firm*—Osha • Liang LLP

(57) ABSTRACT

A dashboard of a vehicle includes an accommodation unit provided at a longitudinal end of the dashboard and positioned adjacent to a door and a side mirror located outside the door adjacent to the accommodation unit, the accommodation unit configured to receive an article, and the accommodation unit including a lid, wherein the lid is configured to stand up adjacent to the side mirror when in an open position.

19 Claims, 4 Drawing Sheets

VEHICLE DASHBOARD ACCOMMODATION STRUCTURE

CROSS-REFERENCE TO RELATED APPLICATIONS

The present application claims priority from Japanese Patent Application No. 2007-142487, filed May 29, 2007 and Japanese Patent Application No. 2008-011740, filed Jan. 22, 2008. The contents of both priority Applications are hereby incorporated by reference in their entirety.

BACKGROUND OF THE DISCLOSURE

1. Field of the Disclosure

Embodiments of the present disclosure relate to vehicle dashboard structures including accommodating units, which can accommodate an article, at a door-side end portion of the dashboard. More particularly, selected embodiments disclosed herein relate to holders for beverage containers (e.g., cup holders) for vehicle dashboards.

2. Description of the Related Art

In the prior art, a container holder (i.e., a "cup holder") that accommodates a beverage container, has been provided at a door-side end of a dashboard of an automobile. As such, a portion of heated and/or cooled air flowing through an airflow path of the vehicle heating ventilation and air conditioning system ("HVAC") provided in the interior of the dashboard is directed to flow in the container holder, either to cool or heat the beverage container. (Refer to Japanese Unexamined Patent Application Publication No. 2000-135935).

However, as formerly presented, the entire periphery of the top portion of the beverage container, for example a can or a paper cup, held in the container holder is exposed. Therefore, when a driver seated in a driver's seat views a side mirror adjacent to passenger's seat, the aforementioned exposed portion of the beverage container may be reflected in a door window and obstruct a line of sight of the driver and be reflected in the side mirror. In one circumstance, when a color of the beverage container is reflected in the side mirror is distinct from a color of the surrounding the dashboard, the driver may become distracted.

SUMMARY OF THE CLAIMED SUBJECT MATTER

In one aspect, the present disclosure relates to a structure of a dashboard of a vehicle including an accommodation unit provided at a longitudinal end of the dashboard and positioned adjacent to a door and a side mirror located outside the door adjacent to the accommodation unit, the accommodation unit configured to receive an article, and the accommodation unit including a lid, wherein the lid is configured to stand up adjacent to the side mirror when in an open position.

In another aspect, the present disclosure relates to a dashboard for a vehicle including an accommodation unit provided at a longitudinal end of the dashboard and positioned proximately to a door and a side mirror located outside the door adjacent to the accommodation unit, the accommodation unit configured to receive an article, the accommodating unit including a lid having an open position and a closed position, and wherein the lid is positioned between the side mirror and the article when in the open position.

In another aspect, the present disclosure relates to an accommodation unit of a vehicle dashboard including a holder means for receiving a beverage container, a lid means operable between an open position and a closed position, the accommodation unit positioned at a longitudinal end of the vehicle dashboard and positioned proximate to a door and a side mirror, and wherein the lid means is configured to be positioned between the beverage container and the side mirror when in the open position.

In another aspect, the present disclosure relates to a method to retain an article in a vehicle dashboard including installing an accommodation unit at a longitudinal end of the vehicle dashboard proximate to a door and a side mirror, wherein the accommodation unit comprises a lid having an open position and a closed position, opening the lid, placing the article in a receptacle of the accommodation unit exposed by the opened lid, and obstructing the side mirror's view of the article with the opened lid.

BRIEF DESCRIPTION OF DRAWINGS

Features of the present disclosure will become more apparent from the following description in conjunction with the accompanying drawings.

FIG. 2A depicts a lid of the container holder in an open position and FIG. 2B depicts the lid in a closed state.

DETAILED DESCRIPTION

An embodiment of the present disclosure will hereunder be given with reference to the drawings.

Figure 1:
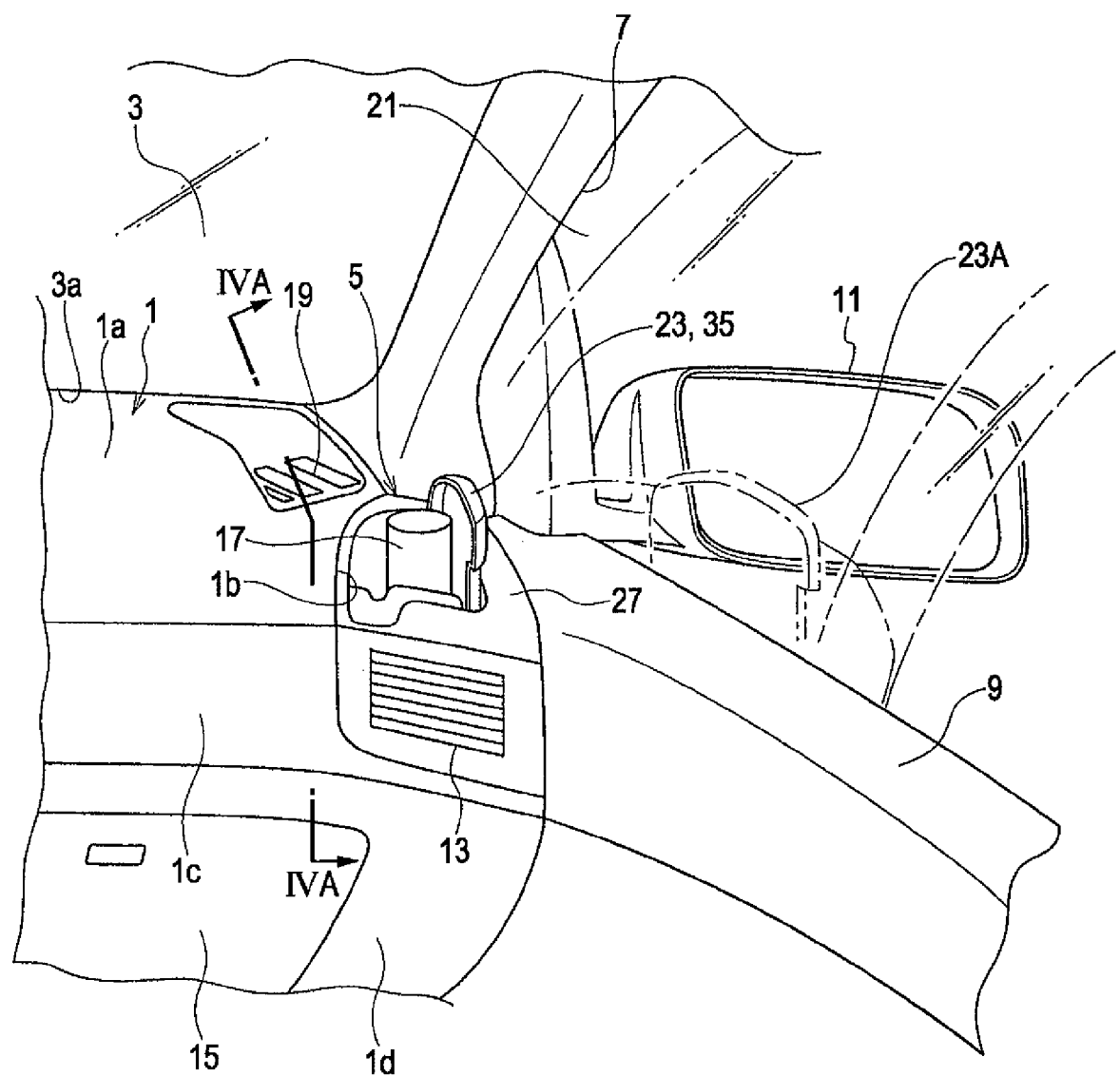
FIG. 1 is a perspective view drawing of an automobile dashboard proximal to a front passenger's seat in an automobile in accordance with embodiments of the present disclosure.

FIG. 1 is a perspective view showing the vicinity surrounding a dashboard assembly 1 on a side of a front passenger's seat in an automobile in accordance with embodiments of the present disclosure. While it is assumed that, in the automobile disclosed, a driver's seat is provided on the left side, it should be understood that the driver's and passenger's positions may be reversed (i.e., in a right-hand-drive vehicle) without departing from the scope of the claimed invention.

As such, dashboard 1 may include a curved top surface 1a that slopes downward as it extends toward the rear of the vehicle from a lower edge 3a of a front windshield 3. A container holder 5 may be provided as an accommodation unit at a door-side (i.e., longitudinal) end 1b of dashboard 1 situated at an outer side of a curved top surface 1a. That is, in the vicinity of a door opening 7 at the longitudinal end 1b of dashboard 1, container holder 5 may be provided as an accommodation unit.

While a container holder 5 (i.e., a cup or beverage holder) is disclosed herein, it should be understood that other accommodation units may be used without departing from the scope of the claimed subject matter. In particular, accommodation units configured to retain cups, bottles, cans, loose change, sunglasses, ashtrays, and various other objects may be substituted for container holder 5 depicted.

In addition, a side mirror 11 may be mounted to a location near container holder 5 upon a door 9 that opens and closes the door opening 7. Thus, mirror 11 may be positioned adjacent to a door window 21 provided by door 9.

Dashboard 1 may also include a front face 1c extending downward from curved top surface 1a. An HVAC vent opening 13 may be provided at an end portion of front face 1c and below container holder 5. A glove box 15 may be provided in a lower inclined surface 1d of dashboard 1. As shown, inclined surface 1d may be continuously formed with front face 1c of dashboard 1 so as to incline further downward from front face 1c and towards the front side of the vehicle.

A pathway for heated and/or cooled air in dashboard 1 for connecting an HVAC system to vent opening 13 may be constructed to divert airflow toward an interior of container holder 5. Thus, the pathway may cause a portion of heated and/or cooled air from the HVAC system to flow into the container holder 5 to heat or cool a beverage container 17 contained therein.

Further, a defrosting side vent 19 may be provided in curved top surface of dashboard 1 and may be disposed between container holder 5 and lower edge 3a of front windshield 3. Air blown from the defrosting vent 19 may be blown in the vicinity of a lower corner of door window 21 to prevent fogging of door window 21.

Figure 2A:
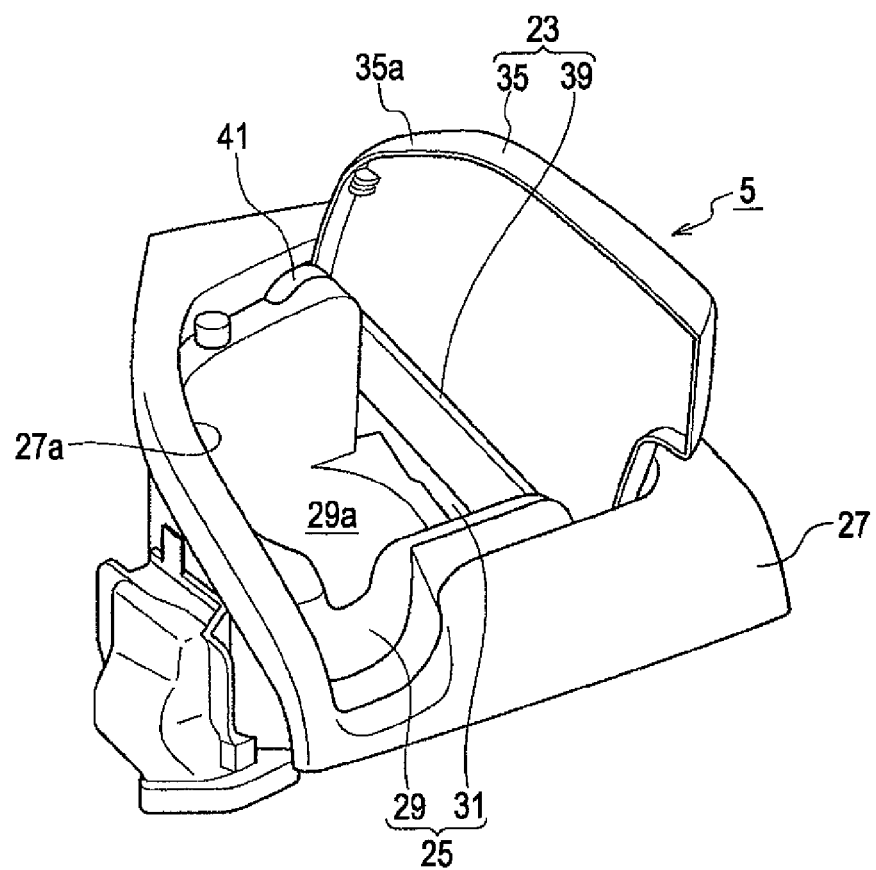
FIGS. 2A and 2B are perspective-view drawings of the container holder shown in FIG. 1, where
Figure 2B:
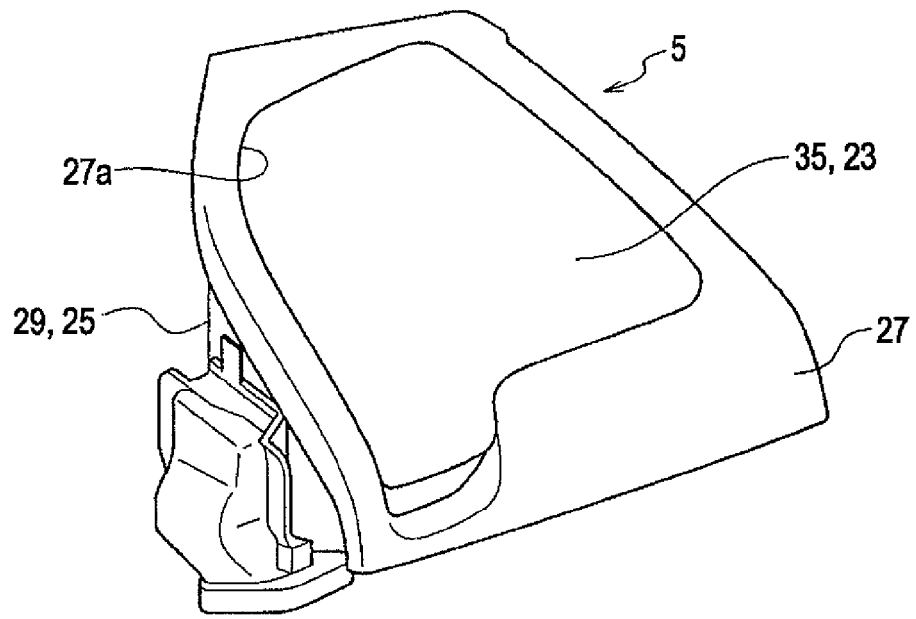
Figure 3:
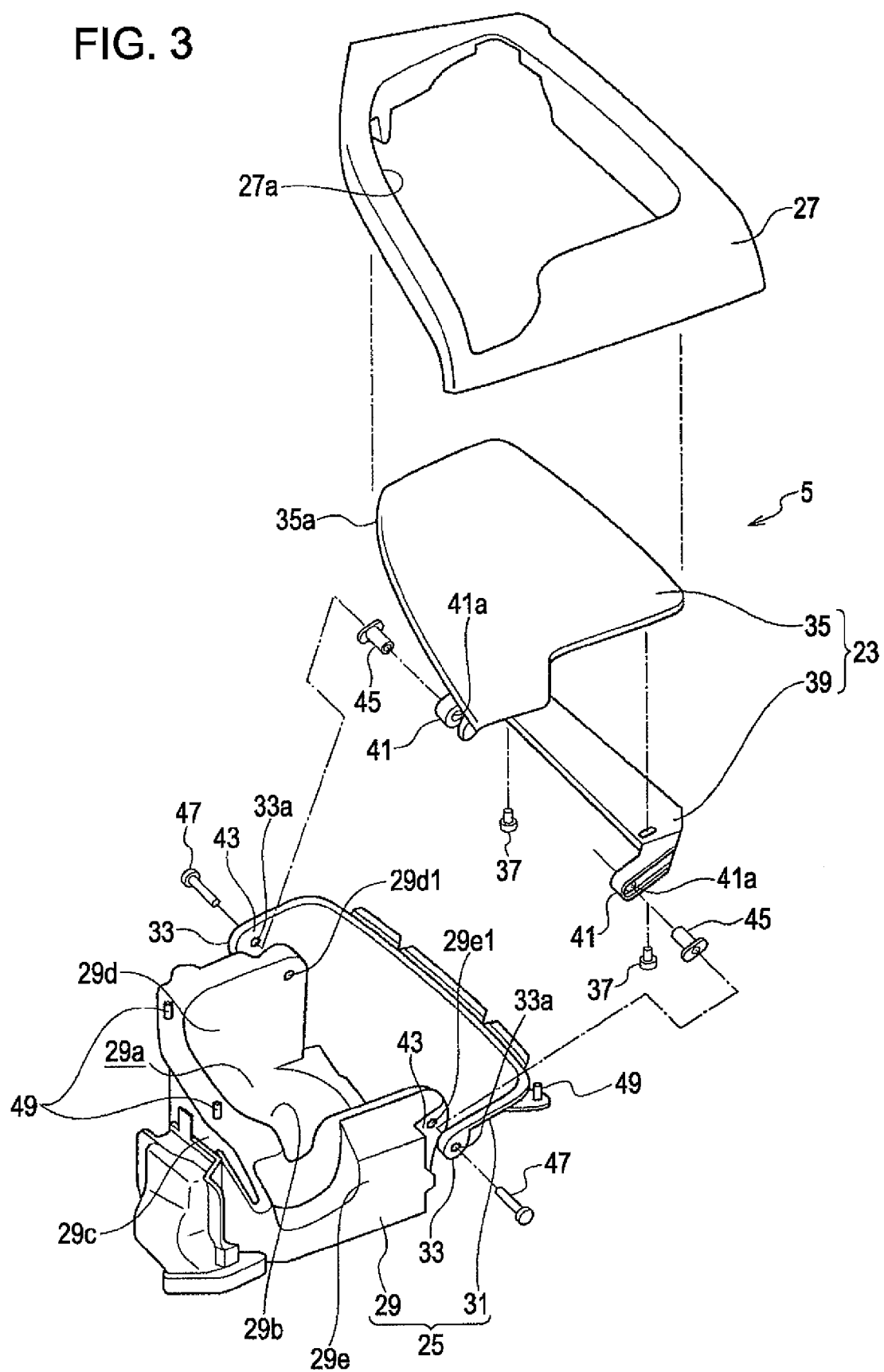
FIG. 3 is an exploded perspective-view drawing of the container holder of FIG. 1.

Next, container holder 5 will be described in conjunction with perspective-view FIGS. 2A and 2B. FIG. 2A depicts a lid 23 of container holder 5 in an open position. In the open position shown in FIG. 2A (and FIG. 1), lid 23 stands up on its side adjacent to side mirror 11. In contrast, FIG. 2B depicts lid 23 of container holder 5 in a closed position. FIG. 3 depicts an exploded perspective view of container holder 5.

As shown, container holder 5 includes a main body 25, lid 23, and a trim piece 27. Lid 23 may be pivotally mounted to main body 25 so that it can be opened and closed. Trim piece 27 may be secured to a top portion of main body 25 so as to cover the periphery of lid 23 when in the closed position. The colors of trim piece 27 and an outer portion 35 (described below) of lid 23 of the lid 23, which are exposed may be the same or similar color as the remainder of dashboard 1.

Main body 25 may comprise a container supporting unit 29 and a lid supporting unit 31. Container supporting unit 29 may have a recessed portion 29a to accommodate a beverage container 17 (FIG. 1). Lid supporting unit 31 may be integrally provided with container supporting unit 29 so as to cover an opening in a vehicle-width direction outer side of container supporting unit 29. As shown, container supporting unit 29 includes a bottom wall 29b, a side wall 29c, a front wall 29d, and a back wall 29e. Bottom wall 29b may define the aforementioned recessed portion 29a. Side wall 29c may be positioned at an inner side in the vehicle-width direction. Lid supporting unit 31 may include supporting protrusions 33 positioned on top portions of front wall 29d and back wall 29e.

Lid 23 may comprise a lid outer portion 35 and a lid inner portion 39. Lid inner portion 39 may be secured to a back face of lid outer portion 35 by screws 37. Lid inner portion 39 may include pair of rotating supporting units 41 of lid inner portion 39 that protrude inward (in the vehicle width direction) from respective longitudinal-direction ends when lid outer portion 35 is closed. Rotating supporting units 41 may be inserted into respective gaps 43. One of gaps 43 may be formed between front wall 29d of container supporting unit 29 and corresponding supporting protrusion 33 of lid supporting unit 31. The other gap 43 may be formed between back wall 29e of container supporting unit 29 and corresponding supporting protrusion 33 of lid supporting unit 31.

Bushing collars 45 may be inserted through holes 41a of rotating supporting units 41. Axial lengths of collars 45 may be substantially the same as gaps 43 and may be slightly longer than the width of rotating supporting units 41. Thus, fasteners 47 (e.g., screws, rivets, bolts, etc) may be inserted through holes 33a of supporting protrusions 33 and collars 45 and into a screw holes 29d1 and 29e1 of front and back walls 29d and 29e.

One of collars 45 may interposed and secured between front wall 29d and corresponding supporting protrusion 33, while the other collar 45 is interposed and secured between back wall 29d and its corresponding supporting protrusion 33 by screws 47. Thus, lid inner portion 29, including rotating supporting units 41, may be rotated around rotating supporting units 41 with respect to main body 25 between open (FIG. 2A) and closed (FIG. 2B) positions.

Additionally, trim piece 27 may include an opening 27a into which lid outer portion 35 in the closed state of FIG. 2B moves. Trim piece 27 may be secured to main body 25 by fitting engaging pins 49 of main body 25 into trim piece 27. Engaging pins 49 may be provided to and protrude upward from a top end surface of main body 25 such that two engaging pins 49 may be provided at container supporting unit 29 one engaging pin 49 may be provided at lid supporting unit 31.

Thus, container holder 5 may be secured to dashboard 1 by fitting it to end portion 1b provided at the lower side of the curved top surface 1a of the dashboard 1 as shown in FIG. 1. Furthermore, protrusions (not shown) of container holder 5 may be engaged into corresponding holes (not shown) of dashboard 1. Such engaging protrusions may be formed at a lower surface of the vehicle front side of trim piece 27 and may protrude in a downward direction.

Figure 4A:
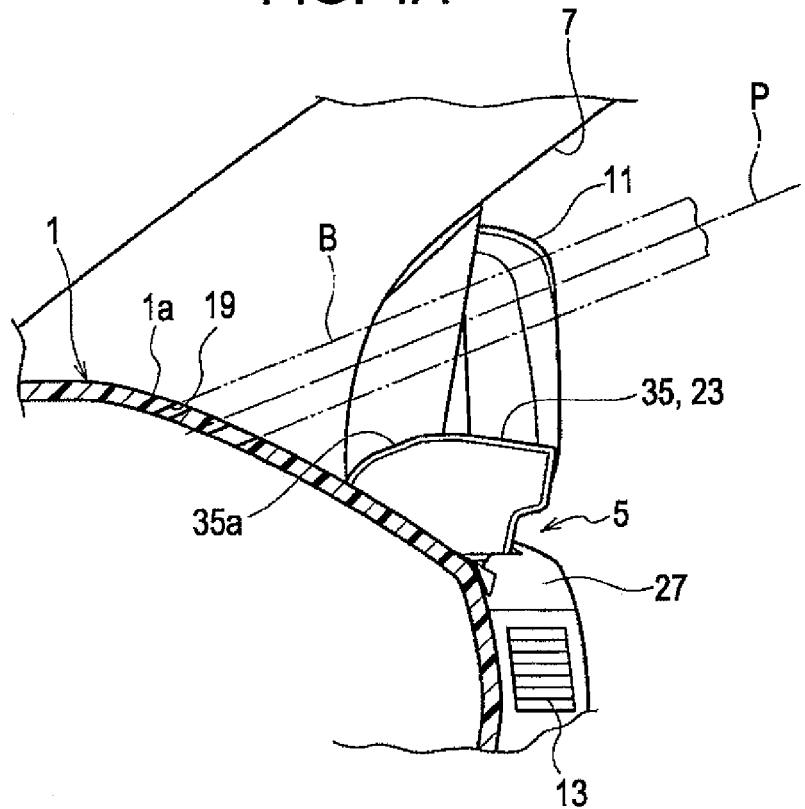
FIG. 4A is sectioned-view drawing of the beverage holder of FIG. 1 taken along line IVA-IVA.
Figure 4B:
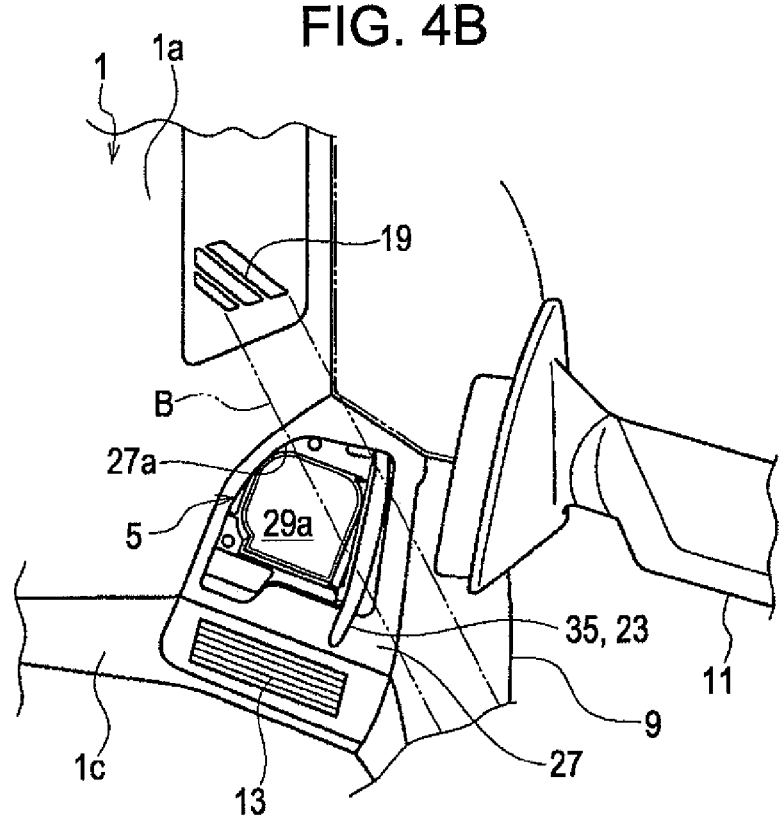
FIG. 4B is a plan view drawing of the container holder of FIG. 1 viewed from the outside of the automobile.

FIG. 4A is a side sectional view of dashboard 1 taken along line IVA-IVA of FIG. 1. FIG. 4B is a plan view of container holder 5 (and vicinity) of FIG. 1 viewed from outside of the vehicle. As such, FIGS. 4A and 4B both depict lid 23 in the open state. As shown in FIG. 4A, outer portion 35 of opened lid 23 may be offset from an area B (indicating a direction in which air is blown out from defrosting side vent 19) so as to not obstruct the flow of air flowing from defrosting side vent 19 to door window 21. Furthermore, in the open state, outer portion 35 of lid 23 may be formed so that a portion 35a situated adjacent to area B extends offset and in the same direction as the an axis (i.e., a central axis) P of the airflow from defrosting side vent 19.

The direction in which the air is blown out from the defrosting side vent 19 may be determined by a louver provided at the defrosting side vent 19.

Accordingly, as shown in FIG. 1, beverage container 17 may be contained in recessed portion 29a of container supporting unit 29 of main body 25 following the opening of lid 23 of container holder 5. Here, beverage container 17 may be cooled or heated by directed heated and/or cooled airflow in recessed portion 29a through the pathway for the heated and/or cooled air in the dashboard 1 described above for diverting airflow toward an interior of container holder 5.

When container holder 5 is not used (i.e., when no beverage container 17 is present), lid 23 may be closed as shown in FIG. 2B to leave a visually appealing appearance. Additionally, leakage of air from recessed portion 29a of the heated and/or cooled air flowing therethrough is restricted. Thus, it may be possible to reduce the amount of heated and/or cooled air that is diverted from vent opening 13.

If container holder 5 were constructed without lid 23, a driver seated to the left of passenger's seat viewing side mirror 11, a portion of the beverage container 17 positioned in container holder 5 adjacent to side mirror 11 would be reflected in door window 21. As such, the portion of beverage container 17 reflected in door window and side mirror 11 might possibly overlap or obstruct a line of sight of the driver.

Therefore, the portion of beverage container 17 reflected in door window 21 may be at a position where it is reflected in side mirror 11.

However, in selected embodiments, lid 23 (including outer portion 35) is positioned between side mirror 11 and beverage container 17 when in the open state. Therefore, a portion of lid 23 having a color similar to that of surrounding portions of dashboard 1 will be reflected (as an image 23A) in door window 21 and side mirror 11 to overlap the line of sight of the driver instead. That is, open lid 23 whose color is similar to that of dashboard 1 will be reflected in side mirror 11 as image 23A hiding beverage container 17. Accordingly, it is possible to prevent beverage container 17 from being reflected in side mirror 11. Therefore, it is possible to prevent a driver from being distracted by a beverage container (or any other object) reflected in side mirror 11, so that the driver may safely check his rearward field of view.

Because the color of lid 23 reflected in side mirror 11 as image 23A may be similar to or the same as that of dashboard 1, it may be less of a distraction to the driver if reflected in side mirror 11 than a beverage container 17 would be.

As shown in FIG. 4B, vehicle rear-end side of open lid 23 (i.e., lid outer portion 35) protrudes in a rearward direction of the vehicle with respect to recessed portion 29a. Therefore, even if the portion of beverage container 17 reflected in door window 21 and side mirror 11 overlaps a line of sight of the driver, the portion of beverage container 17 reflected in door window 21, it is possible to reliably prevent the beverage container 17 from being reflected in the side mirror 11.

Because defrosting side vent 19 that blows out air towards door window 21 at door 9 may be provided in dashboard 1, and because open lid 23 of container holder 5 may be displaced from the area situated towards the front in the direction in which air is blown out from defrosting vent 19, the air blown out from defrosting side vent 19 may be blocked by open lid 23. Therefore, a desired de-fogging function may be ensured for door window 21.

Because a straight-line portion (e.g., 35a of FIG. 2A) extending in the same direction as the airflow blowout direction may be provided at lid 23, it is possible to more effectively prevent lid 23 from blocking the air blown out from defrosting side vent 19 along area B.

Furthermore, it should be understood that other accessories for containing articles other than beverage containers 17 may be used without departing from the scope of the disclosed embodiments.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A structure of a vehicle dashboard, comprising:
an accommodation unit provided at a longitudinal end of the dashboard and positioned adjacent to a door and a side mirror located outside the door adjacent to the accommodation unit;
the accommodation unit configured to receive an article; and
the accommodation unit comprising a lid, wherein the lid is configured to stand up adjacent to the side mirror and between the article and the mirror when in an open position.

2. The structure of claim 1, wherein a color of the lid is similar to a color of a portion of the dashboard.

3. The structure of claim 1, further comprising a defrosting side vent configured to direct airflow at a window of the door, wherein the lid does not obstruct the airflow when in the open position.

4. The structure of claim 3, wherein the lid further comprises a straight-line portion configured to extend substantially parallel and offset from the airflow when the lid is in the open position.

5. The structure of claim 1, wherein the accommodation unit comprises a beverage container holder.

6. The structure of claim 5, wherein the beverage container holder is configured to divert airflow from an HVAC system to heat or cool a beverage container when the lid is in the open position.

7. The structure of claim 1, wherein the lid prevents access to the accommodation unit when in a closed position.

8. The dashboard of claim 1, wherein the accommodation unit comprises a cup holder.

9. The dashboard of claim 8, wherein accommodation unit is configured to divert airflow from an HVAC system to the cup holder when the lid is in the open position.

10. The dashboard of claim 9, wherein the accommodation unit is configured to prevent diversion of airflow from the HVAC system to the cup holder when the lid is in the closed position.

11. A dashboard for a vehicle, comprising:
an accommodation unit provided at a longitudinal end of the dashboard and positioned proximately to a door and a side mirror located outside the door adjacent to the accommodation unit;
the accommodation unit configured to receive an article;
the accommodating unit comprising a lid having an open position and a closed position; and
wherein the lid is positioned between the side mirror and the article when in the open position.

12. The dashboard of claim 11, wherein the article comprises a beverage container.

13. The structure of claim 11, wherein a color of the lid is similar to a color of a portion of the dashboard.

14. The dashboard of claim 11, further comprising a defrosting side vent configured to direct airflow at a window of the door, wherein the lid does not obstruct the airflow when in the open position.

15. An accommodation unit of a vehicle dashboard, the accommodation unit comprising:
a holder means for receiving a beverage container;
a lid means operable between an open position and a closed position;
the accommodation unit positioned at a longitudinal end of the vehicle dashboard and positioned proximate to a door and a side mirror; and
wherein the lid means is configured to be positioned between the beverage container and the side mirror when in the open position.

16. The accommodation unit of claim 15, wherein a color of the lid means is similar to a color of a portion of the vehicle dashboard.

17. The accommodation unit of claim 15, wherein the lid means is configured to not obstruct airflow flowing from a defrosting means to a window of the door.

18. A method to retain an article in a vehicle dashboard, the method comprising:
installing an accommodation unit at a longitudinal end of the vehicle dashboard proximate to a door and a side mirror, wherein the accommodation unit comprises a lid having an open position and a closed position;
opening the lid;

placing the article in a receptacle of the accommodation unit exposed by the opened lid; and
obstructing the side mirror's view of the article with the opened lid.

19. The method of claim 18, wherein the article is a beverage container.

* * * * *